Figure 1:
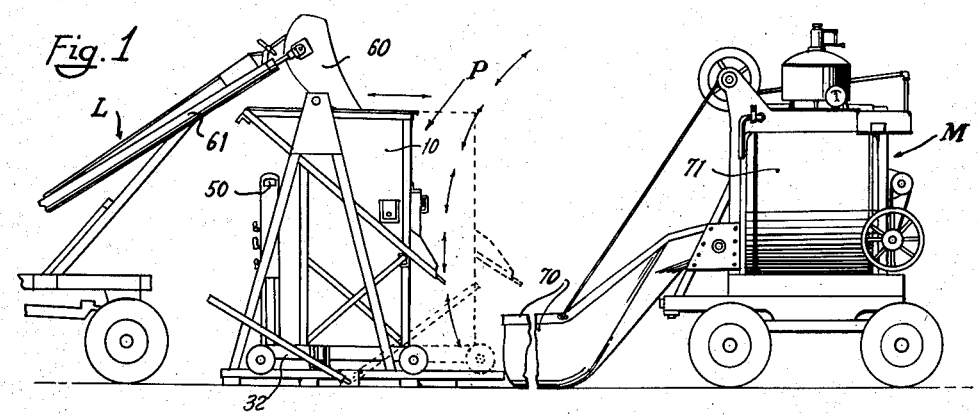

April 8, 1952 W. S. CRAWFORD ET AL 2,591,785
BIN BATCHING PLANT
Filed April 11, 1949 4 Sheets-Sheet 1

William S. Crawford
Arthur S. Graham
INVENTORS

BY

ATTORNEY

April 8, 1952     W. S. CRAWFORD ET AL     2,591,785
BIN BATCHING PLANT
Filed April 11, 1949     4 Sheets-Sheet 2
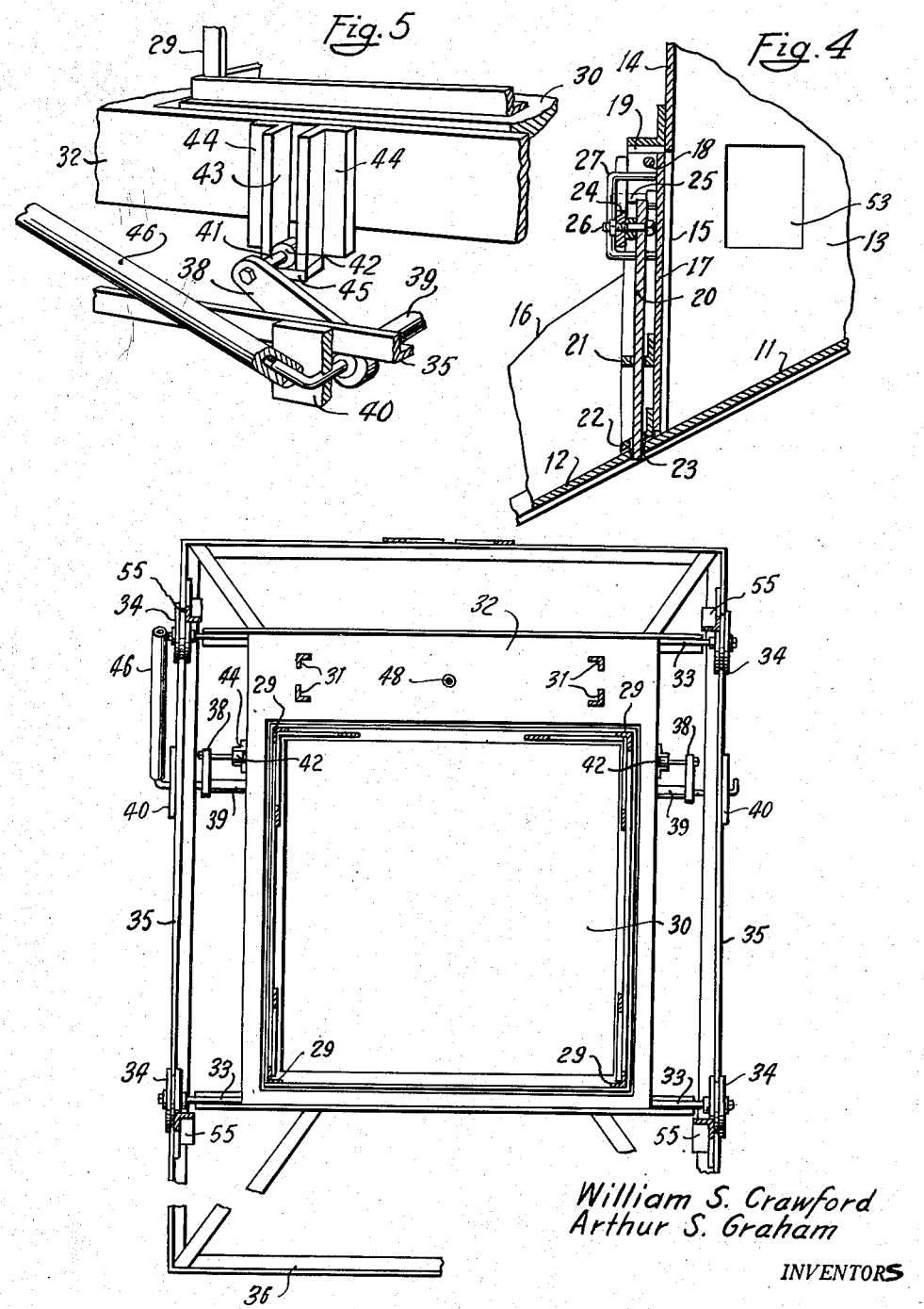
William S. Crawford
Arthur S. Graham
INVENTORS
BY *Hastings Ackley*
ATTORNEY William S. Crawford
Arthur S. Graham
INVENTORS

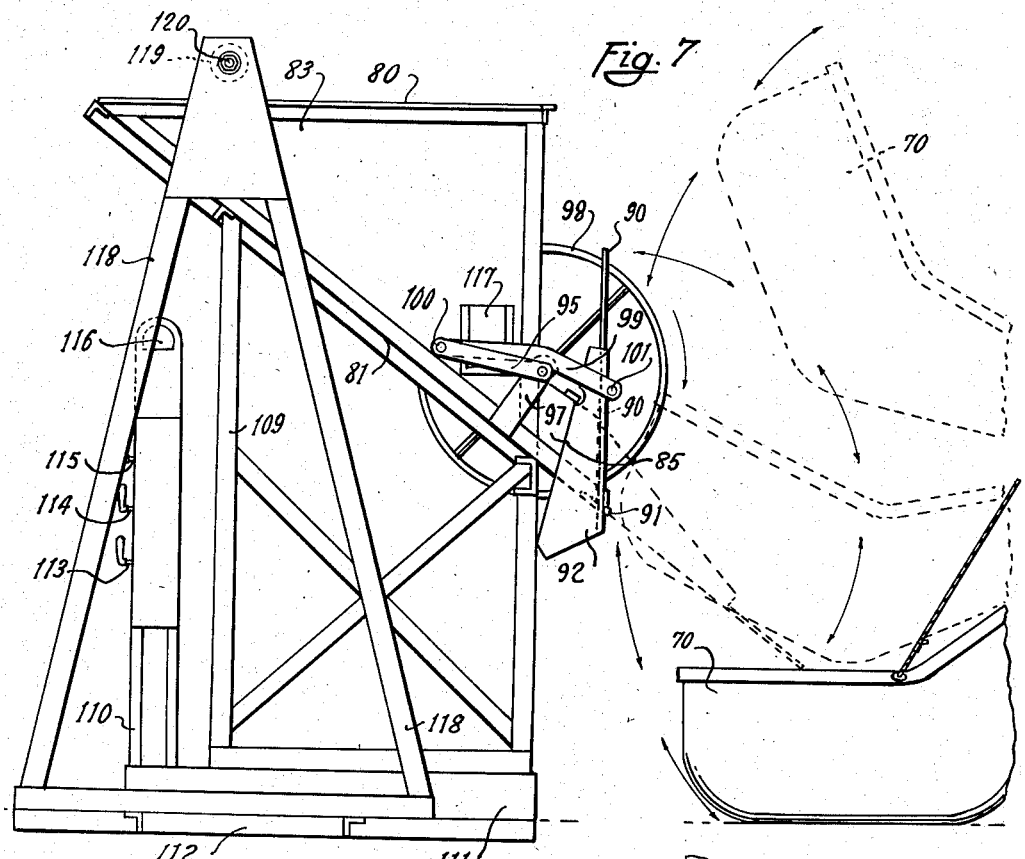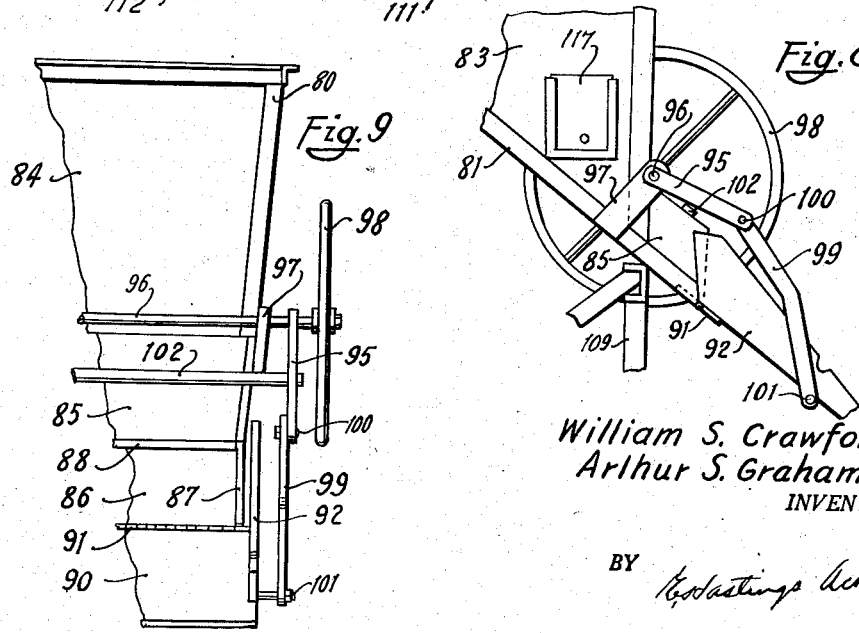

Patented Apr. 8, 1952

2,591,785

UNITED STATES PATENT OFFICE 2,591,785

BIN BATCHING PLANT

William S. Crawford, Dallas, and Arthur S. Graham, Carrollton, Tex.

Application April 11, 1949, Serial No. 86,618

4 Claims. (Cl. 222—160)

This invention relates to new and useful improvements in bin batching plants, and is directed more particularly to a small bin batching plant for accurately weighing sand, gravel, crushed rock, or other aggregate, and the like for use in making concrete, said plant being especially suited for use in connection with small portable concrete mixers of three bag capacity or smaller.

Efficient mixer operation, in the making of mixed concrete in fairly large quantities, requires adequate apparatus to insure a steady supply of successive batches of accurately proportioned materials to the mixer. The batching mechanism for delivering the aggregate to the mixer should be carefully co-ordinated with the mixer, not only to insure uniformity of products but also to minimize idle time for the mixer between mixing cycles.

It is, therefore, an important object of the invention to provide a bin batching plant wherein the bin is mounted on the platform of platform scales, whereby the materials introduced into the bin may be measured by weight to assure correctly proportioned mixes thereof before the materials are delivered from the bin to the mixer.

Another object of the invention is to provide a bin batching plant which is adapted for use with an ordinary portable mixer having a skip into which the materials are discharged from the bin for delivery into the mixer drum, and wherein the bin batching plant is arranged to positively assure delivery of materials from the bin into the skip without spilling and is also so arranged that the plant does not interfere with movement of the skip to an elevated position for discharging the materials from the skip into the mixer drum.

A further object of the invention is to provide a bin batching plant having the bin mounted on the platform of platform scales, and wherein the frame of the platform scales is movable toward and from the skip of a portable mixer, whereby the bin outlet chute may be positioned above the skip to deliver the materials from the bin into the skip and may then be retracted from such position to permit the skip to be elevated to discharge the materials into the drum of the mixer.

A still further object of the invention is to provide, in a bin batching plant of the character described, means for moving the scales and bin toward and from the skip of the mixer, whereby the materials may be delivered directly from the bin to the skip by gravity and the skip may be elevated without interference by the plant.

Still another object of the invention is to provide a bin batching plant which may be mounted on a vehicle in combination with a mixer, whereby both the plant and mixer are readily portable as a unit.

It is a further object of the invention to provide, in a bin batching plant of the character described, means independent of the bin and scales upon which the loading bucket of the material elevating machine may be tiltably rested or bumped, whereby materials may be accurately delivered from the bucket of such elevating machine into the bin without affecting the measurement of the materials delivered into the bin.

It is also an object of the invention to provide a bin batching plant in which the bin is mounted on the weighing platform of platform scales and the frame of the scales is stationary and wherein the bin is provided with an extensible and retractable outlet chute for delivering materials to the skip of a mixer, said chute when retracted being arranged to close the outlet from the bin and to permit the skip to be elevated without interference by the chute.

Another object of the invention is to provide a bin batching plant of the character described which is simple in structure and economical to manufacture.

Figure 2:
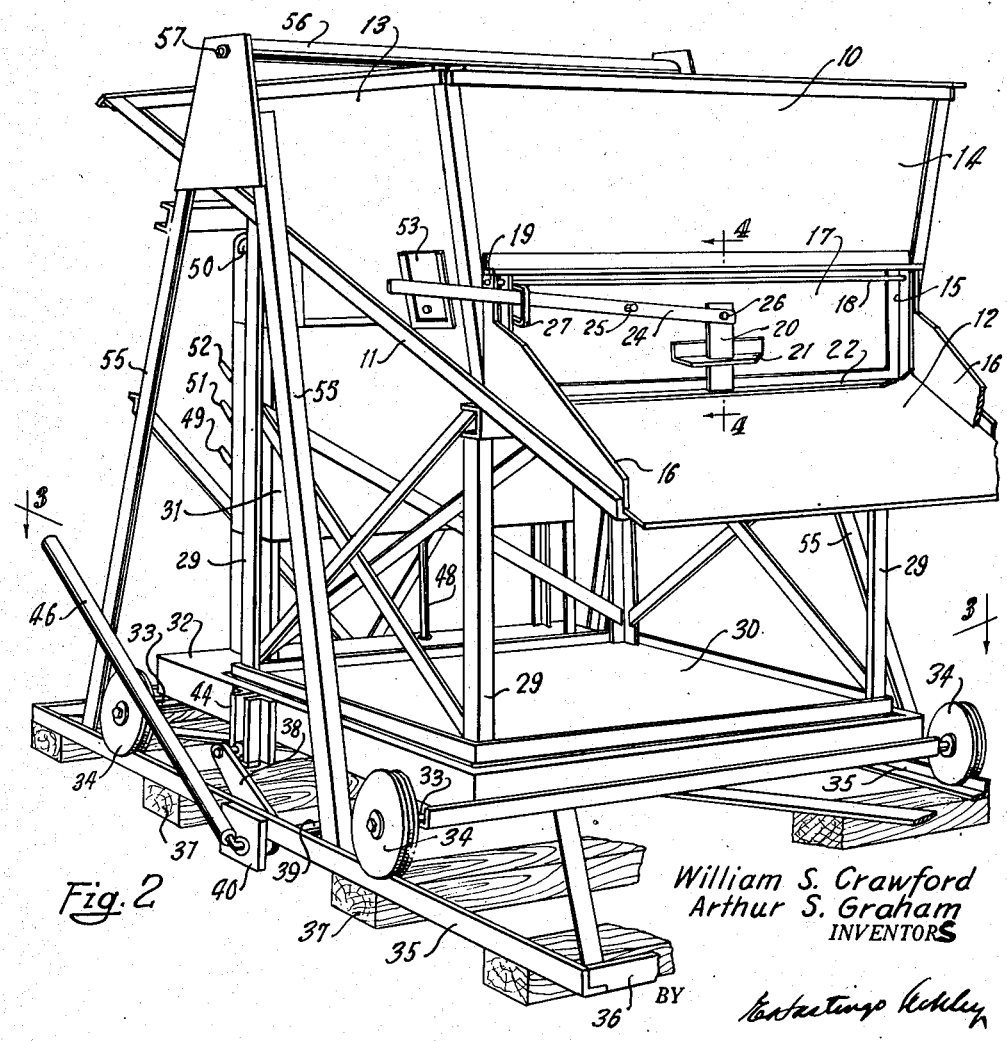
Figure 6:
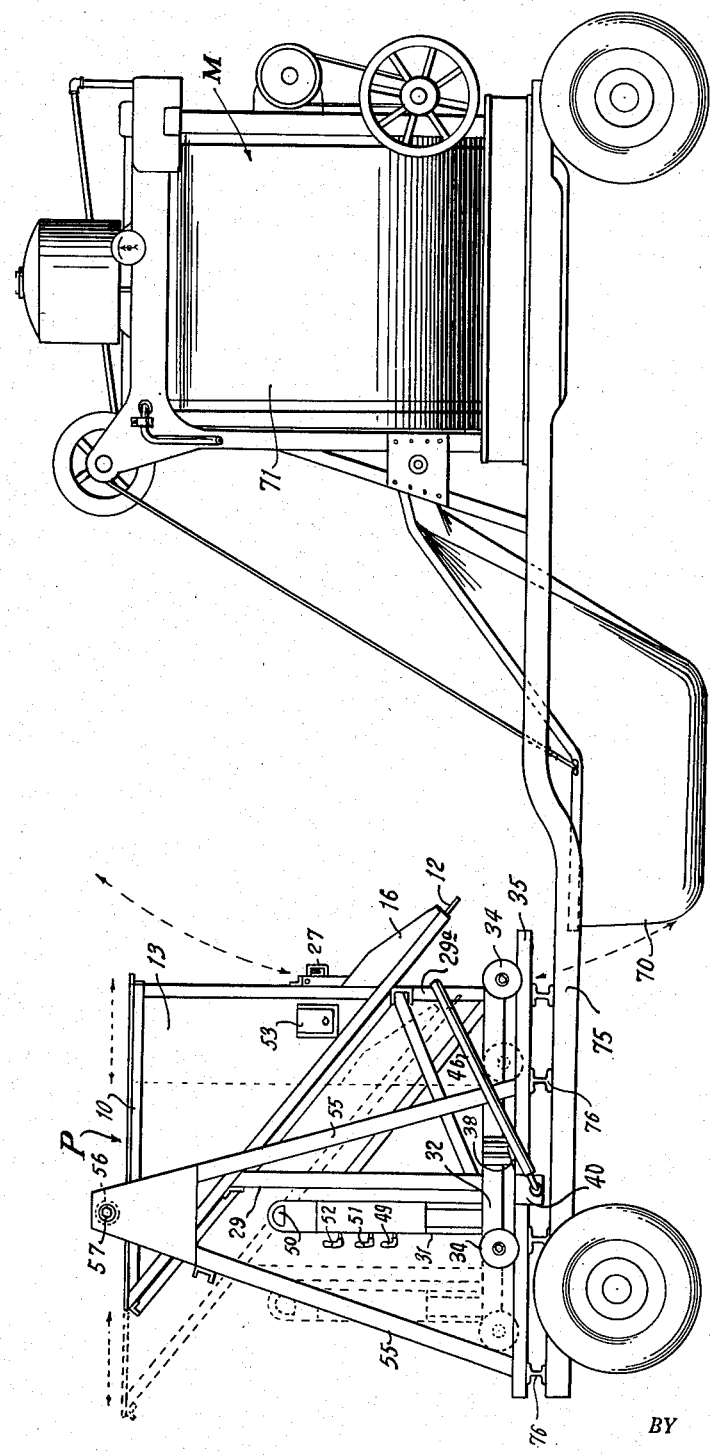

Additional objects and advantages of the invention will readily be apparent from the reading of the following description of a device constructed in accordance with the invention, and reference to the accompanying drawings thereof, wherein:

Figure 1 is a side elevation and general view of an apparatus embodying one form of the invention, Figure 2 is an enlarged perspective view of the bin batching plant of Figure 1, Figure 3 is a horizontal sectional view taken on the line 3—3 of Figure 2, Figure 4 is an enlarged fragmentary vertical sectional view of the gate and latch taken on the line 4—4 of Figure 2, Figure 5 is an enlarged fragmentary isometric view of the handle end of the bin and scale moving lever mechanism, Figure 6 is a side elevation of a portable unit having the bin batching plant and mixer mounted on a wheeled vehicle, Figure 7 is a side elevation of a modified form of the bin batching plant, Figure 8 is a fragmentary side elevation of the outlet chute of the modified form of plant showing the chute in extended discharging position, and Figure 9 is a fragmentary front elevation of the bin and chute of the modified form.

For ease of identification, the three units of the apparatus shown in Figure 1 of the drawings have been designated by letters. The concrete mixer unit is designated M, the bin batching plant is designated P, and the front tractor loader unit for loading aggregate in the bin of the plant is designated L.

The most important unit of the apparatus is the bin batching plant P, the front tractor loader L and the mixer M being conventional equipment. The loader L scoops up the sand, gravel, stone or other aggregate from piles of such material and elevates and deposits such material in the bin batching plant P, where the amount of material so deposited is carefully proportioned by weight. The weighed proportioned materials are then delivered from the bin batching plant into the skip of the mixer M, and are discharged from the skip into the rotating drum of the mixer for mixing with water in the usual manner, after which the mixed concrete is discharged from the mixer drum for use.

The bin batching plant P includes a bin 10 having a substantially rectangular open upper end and having its bottom 11 inclined downwardly and forwardly and provided with an outlet chute 12 at its forward lower end. The side walls 13 of the bin are substantially triangular in configuration, and the lower edges of such side walls converge toward their lower end, as clearly shown in Figure 2. The front wall 14 of the bin is substantially vertical and has an outlet opening 15 provided in its lower portion communicating with the chute 12, whereby the material deposited in the bin may discharge through the opening and along the chute. Side walls 16 are provided at each side of the chute for retaining the material discharged through the opening 15 on the bottom of the chute, whereby the materials are directed to the skip of the mixer, as will hereinafter be more fully explained.

A closure gate or door 17, substantially rectangular in form, is pivotally mounted at its upper end on a cross rod 18 which has its ends secured in upright extensions 19 of the side plates 16 of the chute adjacent the upper end of the outlet opening 15 from the bin. The gate 17 thus swingably closes the outlet opening in the lower portion of the front wall of the bin, and may swing about the rod 18 at its upper end to an open position to permit the material in the bin to discharge through said opening. For releasably holding the closure gate in closed position, a catch bar 20 is slidably mounted in an angular guide member 21 located substantially centrally of the gate, and extends downwardly through an opening formed in the lower angular frame member 22 of the gate. The catch bar is arranged to engage in a lock hole 23 provided in the bottom 11 of the bin for holding the gate in closed position, and may be lifted upwardly out of the lock hole to permit the closure gate to open. Lifting of the catch bar is done by means of an elongate lever arm 24 mounted on a pivot pin 25 on the face of the gate and having one end connected by a pin 26 with the upper end of the catch bar. The other arm of the lever extends outwardly past the end of the gate, where it may be grasped by an operator and moved downwardly to lift the catch bar out of the lock hole and permit the gate to open. A guide and retaining loop 27 is secured to the side frame of the gate for guiding and limiting the movements of the lever arm.

The bin is mounted on the upper end of a frame 29, which is carried on the weighing platform 30 of a platform scale 31. The scale frame 32 is mounted on axles 33 at each end of the frame, and grooved wheels 34 carried by the axles ride on spaced tracks 35 forming part of a base frame 36. The base frame may be mounted on the ground or on wooden cross blocks 37 laid on the ground. The wheels permit the scale, and the bin carried thereby, to be moved along the tracks from a retracted position to a position in which the discharge chute 11 is positioned above the skip of the mixer M.

The scale is moved along the tracks 35 by means of crank arms 38 mounted at each side of the scale frame on a cross shaft 39 having its ends rotatably mounted in depending lug-like bearing members 40 carried by the rails 35. A pintle 41 having a roller member 42 at its outer end is mounted on the outer swinging end of each crank arm 38, and these rollers ride in vertical tracks 43 formed between vertical angle members 44 secured to the sides of the scale frame. A stop 45 at the lower end of the track prevents downward displacement of the roller from the track. The end of the cross shaft 39 is turned at right angles to its longitudinal axis and an operating handle 46 is removably mounted thereon for turning the shaft to swing the crank arms. When the crank arms are swung, the rollers 42 engage against the angle members 44 to move the scale frame and the bin carried by the scale on the track.

The length of the crank arms and the length and position of the track angle members are such that the crank arms are disposed at an angle only slightly above horizontal at each end of their movement, so that they act to restrain the scale against movement when the bin is being loaded or discharged. Thus, the scale and bin are substantially locked in loading or discharging positions by the scale moving lever mechanism.

The weighing mechanism of the platform scale is conventional in form, the platform being connected by means of a link 48 with the scale arms or beams (not shown), upon which the standard weights or poises are adjustably mounted for determining the weight supported by the platform. The scale illustrated includes a plurality of beams, each of which is selectively operable separately or in conjunction with the others, whereby the weights of different types of material introduced into the bin may be determined cumulatively. Thus, one beam may be operatively connected with the platform by moving a release lever 49, and when the proper amount of material, such as gravel, has been introduced into the bin, an indicator 50 provided at the upper end of the scale riser will be moved to indicate that the weight of the material in the bin has reached the proper value. Then, a second release lever 51 may be turned to bring into action a second scale beam having a predetermined weight setting, to permit the introduction of additional material, such as sand, into the bin in a pre-determined quantity by weight, the indicator 50 showing when such quantity of sand has been introduced. A third release lever 52 is indicated on the upright of the scale, and this lever may be used to release a third beam for indicating the weight of crushed rock, cement or other material introduced into the bin.

Obviously, the number of beams on the scale may vary in accordance with the requirements of the user, and the number of beams actually placed in use may likewise be determined by the user.

An opening in one of the sides of the bin is closed by a sliding door 53, and this opening permits removal of excess material from the bin in the event a greater amount of material is introduced into the bin than is desired. The door is slid up to open the opening and permit excess material to run out through the opening until only the desired weight is contained in the bin.

A fixed roller supporting frame having risers 55 on each side of the bin is secured to the rear portion of the base frame 36, and the risers carry at their upper ends a roller bumper or rest bar 56 which is rotatably mounted on a shaft 57 secured to the upper ends of the risers on each side of the bin. The rest or bumper is thus independent of and spaced above the open upper end of the bin. This rest or bumper roller is provided for the purpose of supporting the bucket or scoop 60 of the front tractor loader L, so that said scoop or bucket may be tilted thereon to unload or dump the gravel, sand, or other aggregate into the bin in controlled quantities. The roller permits the bucket to move as the hoisting beam 61 of the loader is elevated to tilt the forward outlet end of the bucket downwardly toward the bin to permit the sand or gravel or the like to be discharged from the bucket. By controlling the degree of tilting of the bucket, the amount of material discharged from said bucket into the bin may be rather closely controlled. Obviously, the weight of the bucket is thus prevented from being imposed upon the bin and the platform of the scales, so that only the true weight of the material introduced into the bin is registered by the scale indicator.

When the desired proportions of sand, gravel, or other material have been dumped into the bin, the skip 70 of the mixer M is lowered to receiving position, and the scale frame 32 is moved forward on the tracks 35 by means of the bell crank levers 38, which are swung by moving the lever arm 46 in a clockwise direction. The scale frame is moved forwardly until the outer end of the chute 12 is positioned above the mixer skip, as shown in dotted lines in Fig. 1, whereupon the closure gate 17 is opened, by releasing the catch bar 20 from the lock hole 23, to permit the materials in the bin to escape therefrom through the opening 15 and be discharged into the skip of the mixer. After the materials have been discharged into the mixer skip, the lever arm 46 is swung in a counter clockwise direction to move the scale frame, and the bin carried thereby, to the retracted position shown in full lines in Figure 1. The mixer skip 70 may then be elevated, without interference by the bin chute, to transfer the materials into the drum 71 of the mixer. The catch member 20 on the bin outlet closure gate is then re-engaged in the lock hole 23 to positively close the gate, whereupon the bin batching plant may be reloaded with sand, gravel and other materials in the manner just described to provide another batch of materials for delivery to the skip of the mixer.

If desired, the bin batching plant P may be mounted on the frame 75 of a wheeled vehicle, together with the mixer M, to provide a compact portable combination unit. The structure of this modification of the bin batching plant is shown in Figure 6, and the bin batching plant is identical in all respects to that of the form first described, except that the height of the frame 29a on which the bin is mounted is shortened to position the outlet end of the chute more closely adjacent the mixer skip when said skip is in the lowered receiving position. The base frame 36 of the plant is mounted on I-beams 76 secured transversely of the vehicle frame.

Manifestly, this structure provides a compact portable unit by means of which the bin batching plant and mixer may be transported from job to job, and wherein the plant and mixer are constantly maintained in proper cooperative functioning relationship so as to be always ready for use together.

A modified form of the bin batching plant is illustrated in Figures 7 through 9, wherein the platform scales and the bin are stationary and the bin is provided with an extensible and retractable outlet chute for delivering materials from the bin to the skip of the mixer.

This modified form of the bin batching plant includes a bin 80, substantially identical in form to that of the bin previously described, having a substantially rectangular open upper end and having its bottom 81 inclined downwardly and forwardly. The side walls 83 of the bin are substantially triangular in configuration and the lower edges of such side walls converge toward their lower end, as clearly shown in Figure 9. The front wall 84 of the bin is substantially vertical and has an outlet opening provided in its lower portion communicating with a rectangular outlet chute mouth 85, whereby material deposited in the bin may discharge through said outlet mouth. The chute mouth is provided with a bottom plate 86 forming a continuation of the bottom of the bin, and has side walls 87 and a top cover wall 88.

Mounted at the lower outer end of the bottom plate 86 of the outlet mouth is an extension chute and closure gate 90 which is connected with said bottom plate by a hinge 91, so that the chute extension may be swung on the hinge from a position closing the open end of the mouth, as shown in Figure 7, to a position forming an extension of the mouth, as shown in Figure 8. The extension chute is provided with side walls 92, so that when it is in extended position it forms a continuation of the outlet mouth 85 for delivering materials from the bin into the skip 70 of the mixer. When in the elevated retracted position, shown in Figure 7, the extension chute and closure gate 90 abuts against the open end of the outlet mouth 85 to close the same to prevent discharge of materials from the bin.

For moving the extension chute and for holding it in its retracted and extended positions, crank arms 95 are swingably mounted at each end of an elongate shaft 96 which is rotatably mounted in bearing support members 97 carried by the side frames of the bin so that the shaft is positioned adjacent the upper end of the outlet mouth. The crank arms are provided at each side of the outlet mouth, and are connected with the outer end of the extension chute by means of connecting links 99 which are each connected at one end by a pin 100 to the outer end of one of the crank arms 95 and at their other end to the outer end of the extension chute 91 by a pin 101. The connecting links are bent at an angle between their ends, as illustrated in Figures 7 and 8, whereby when the crank arm and connecting links are in the retracted position, shown in Figure 7, the shaft 96 is positioned at a point, in the bend of the connecting links, past a line between the pins 100 and 101 at the ends of the connecting links. Thus, any force applied against the extension chute by material in the outlet mouth 85 would tend to pull the connecting link 99 outwardly, but since the line of pull against the pin 100 is below the center of the crank shaft 96, such outward force tends to swing the crank arms 95 in a counter-clockwise direction and thus urges the connecting links 99 into tighter engagement with the crank shaft. The extension chute is therefore locked in closed position.

When the hand wheel 98 is turned to swing the crank arms 95 outwardly to move the extension chute to extended position, the rotative movement of the crank arms is limited by an elongate stop member 102 fixedly secured to the upper wall of the outlet mouth. The engagement of the crank arms with the stop member prevents further rotative movement of the crank arms and thus supports the extension chute in the extended position, as shown in Figure 8.

If desired, lengths of chain or flexible cable may be connected at one end with the outer end of each side of the extension chute and at their other end with the upper portion of the frame of the bin, whereby the chute is positively supported by the chains or cables when the chute is in extended position.

When the chute is retracted, as shown in Figure 7, the skip 70 of the mixer may be elevated past the chute without interference. However, when the chute is extended in the manner shown in Figure 8, the outer end of the chute is disposed above the open upper end of the skip and materials may flow from the bin into the skip.

The bin 80 is mounted on the upper end of a frame 109, which is carried on the weighing platform of a platform scale 110. The scale frame 111 is securely fixed on a base frame 112, which may be supported on the ground or on the frame of a wheeled vehicle carrying the bin batching plant and the mixer, in the same manner as the bin batching plant of the form previously described. The weighing mechanism of the platform scale is conventional in form and includes the usual upright having provided therein a plurality of scale beams, each of which is separately connectable with the platform of the scales so as to be selectively operable separately or in conjunction with each other, so that the weights of different types of material introduced into the bin may be determined cumulatively. Thus, one beam may be placed in operative position by moving a release lever 113 to connect the beam with the platform, so that when the proper amount of material has been introduced into the bin an indicator 116 at the upper end of the scale riser will show that the weight of the material in the bin has reached the desired proper value. Then, a second release lever 114 may be turned to bring into action a second scale beam, having a predetermined weight setting, to permit the introduction of additional material into the bin in a predetermined quantity by weight, the indicator 116 showing when such quantity of material has been introduced. If desired, a third release lever 115 may then be turned to connect a third scale beam with the platform of the scale for indicating when an additional amount of another ingredient or material introduced into the bin has reached a desired value by weight.

The quantities of material introduced into the bin are weighed cumulatively; that is, the weight of the first introduced material is indicated by the first beam, and when the second beam is placed in operative condition, the weight of the second material introduced into the bin will be added to the weight of the first material to cumulatively act upon the scale beams to indicate when the proper weight of the second material has been delivered into the bin. Obviously, the number of beams on the scale may vary in accordance with the requirements of the user, and the number of beams actually placed in use may likewise be determined by the user.

A fixed roller supporting frame having risers 118 on each side of the bin is secured to the rear portion of the base frame 112 and carries at its upper end a roller bumper or rest bar 119 which is rotatably mounted on a shaft 120 secured to the upper end of the frame risers on each side of the bin so as to be independent of and spaced above such bin. This rest or bumper roller is provided for the purpose of supporting the bucket or scoop 60 of the front tractor loader L, so that the scoop bucket may be tilted to unload or dump sand, gravel or other aggregate into the bin in controlled quantities without applying the weight of the scoop to the bin. Thus, only the true weight of the materials introduced into the bin are registered by the scale indicator.

When the desired proportions of sand, gravel and other material have been dumped into the bin, the skip 70 of the mixer is lowered into receiving position, and the hand wheel 98 is turned to swing the crank arms 95 so that the extension chute 90 is moved to the extended position shown in Figure 8. This movement of the extension chute opens the lower end of the outlet mouth 85 from the bin and permits materials in the bin to flow through the mouth and along the chute into the skip of the mixer. When the materials have been discharged from the bin into the mixer skip, the hand wheel 98 is turned in the opposite direction to swing the extension chute 90 to the retracted closed position shown in Figure 7, whereupon the mixer skip may be raised past the bin batching plant to discharge the materials from the skip into the mixer drum. With the extension chute in the retracted position, the outlet mouth 85 from the bin is closed and the bin may be recharged with the desired proportion of material and the operation repeated.

As has already been pointed out, the base frame 112 of the bin batching plant may be mounted on the frame 75 of a wheeled vehicle, together with the mixer M, to provide a compact portable combination unit. The structure of the bin batching plant in such event would be modified only by shortening the height of the frame 109 to position the outlet mouth and extension chute of the bin closer to the skip of the mixer.

From the foregoing, it will be seen that a small bin batching plant has been provided wherein the bin is mounted on the weighing platform of a platform scale so that materials introduced into the bin may be measured by weight to assure correctly proportioned mixes thereof before the materials are delivered from the bin to the mixer. It will also be seen that, in both forms of the invention, the proportioned materials are delivered from the bin of the plant into the skip by gravity without spilling and without interfering with the operation of the mixer skip.

It will further be noted that a small portable bin batching plant has been provided which may be constructed and operated as a unit separate from the mixer, or which may be mounted on a wheeled vehicle with the mixer to provide a compact portable combination unit which is constantly in proper operating relationship.

It will further be seen that the bin batching plant is provided with means, independent of the bin and scale, upon which the loading bucket of the material elevating machine may be tiltably rested or bumped to assure delivery of materials from the elevating machine into the bin without affecting the measurement of the materials delivered into the bin.

Likewise, the unit is manifestly simple in structure and economical to manufacture, and provides a plant for positively and accurately proportioning materials to be used in the manufacture of concrete which is so simple in operation that an unskilled laborer may be used for proportioning the materials and delievering them in such correct proportions to the mixer.

Furthermore, it will readily be seen that the bin batching plant is operable by a single laborer, thus producing the desired outlined results with a minimum of labor costs.

The foregoing description of the invention is explanatory only, and changes in the details of the construction illustrated may be made by those skilled in the art, within the scope of the appended claims, without departing from the spirit of the invention.

What we claim and desire to secure by Letters Patent is:

1. A bin batching plant including, a base frame, a platform scale having a frame and a weighing platform and having a plurality of separate weighing beams selectively connectable with said weighing platform, wheels mounted on opposite sides of the frame of the platform scale, a horizontal track on the base frame on which the wheels of the platform scale are movable, a lever pivotally mounted on the base frame and connected with the frame of the scale for moving the scale reciprocably on the track a predetermined limited distance and back to its original position, a bin supporting frame mounted solely on the movable weighing platform of the scale, a bin carried by the supporting frame open at its upper end and having an elongate inclined bottom wall and having side walls and a front wall joining the side walls and terminating short of the bottom wall to provide an outlet opening across the front of the bin co-extensive in width with the bottom of the bin thereat, the bin being positioned on the supporting frame with the outlet opening disposed in the line of movement in the scale on the base frame, an outwardly swingable closure for the outlet opening of the bin, and a projecting chute connected with the outlet opening and projecting outwardly and downwardly therefrom to form a continuation of the bottom wall of the bin.

2. A bin batching plant including, a stationary base frame; a horizontally movable platform on said base frame; tracks on the base frame; a bin mounted on said movable platform and having a gravity delivery outlet chute opening in a direction in which the platform moves; a lever arm pivotally mounted on one end of the base member and having its other end connected with the movable platform, said lever arm being swingable to move the movable platform reciprocably a predetermined limited distance on said tracks, whereby the outlet chute from the bin may be positioned above a mixer skip and retracted from such position to its original position.

3. A bin batching plant including, a stationary base frame; tracks on said frame; a movable platform mounted on said base frame for limited horizontal movement; a bin mounted on said movable platform and having a gravity delivery outlet chute; wheels on said platform riding on said tracks; manually operable means connected with the base frame and the platform for moving the platform reciprocably a limited horizontal distance on the tracks on the base frame, said manually operable means being operable to move the platform to position the bin outlet chute above a mixer skip when the skip is in lowered receiving position, and being operable to move the platform back to its original position with the outlet chute clear of the arc of travel of the skip when the skip is moving to elevated emptying position and return.

4. A bin batching plant including, a base frame, a platform scale carried by the base frame and having a frame and a weighing platform, a bin supporting frame mounted solely upon the movable weighing platform of the scale, a bin carried by the supporting frame open at its upper end and having an elongate inclined bottom wall and having side walls and a front wall joining the side walls and terminating short of the bottom wall to provide an outlet opening across the front of the bin coextensive with the bottom wall of the bin thereat, an outwardly swingable closure for the outlet opening, an outlet chute connected with the outlet opening and spaced above the base member, spaced horizontal tracks on the base frame, wheels mounted on the opposite sides of the frame of the platform scale to ride on the tracks of the base frame, whereby the platform scale and bin carried thereby may undergo a limited horizontal movement on said tracks, the bin being positioned on the supporting frame with the outlet opening disposed in the line of movement of the scale on the base frame, a lever arm pivotally mounted at one end on the base member and having its other end connected with the frame of the platform scale, said lever arm being swingable to move the frame of the platform scale reciprocably a limited distance on the tracks carried by the base member, said scale when so moved carrying the bin horizontally therewith, whereby the outlet chute from the bin may be positioned above a mixer skip and retracted to its original position.

WILLIAM S. CRAWFORD.
ARTHUR S. GRAHAM.

REFERENCES CITED

The following references are of record in the file of this patent:

UNITED STATES PATENTS

| Number | Name | Date |
| --- | --- | --- |
| 28,568 | Fish | June 5, 1860 |
| 529,628 | Goff | Nov. 20, 1894 |
| 808,599 | Crichfield | Dec. 26, 1905 |
| 1,663,574 | Venable | Mar. 27, 1928 |
| 1,805,769 | Johnson | May 19, 1931 |
| 1,808,799 | Venable | June 9, 1931 |
| 1,878,874 | McBride | Sept. 20, 1932 |
| 2,285,765 | Carswell | June 9, 1942 |